(12) United States Patent
Goeser et al.

(10) Patent No.: US 11,214,027 B2
(45) Date of Patent: Jan. 4, 2022

(54) PROCESS FOR THE MULTI-STAGE PRODUCTION OF A TRACTION OR CARRYING MEANS

(71) Applicant: ContiTech Antriebssysteme GmbH, Hannover (DE)

(72) Inventors: Hubert Goeser, Dannenberg (DE); Andre Kucharczyk, Guelden (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 555 days.

(21) Appl. No.: 16/326,734

(22) PCT Filed: Jun. 19, 2017

(86) PCT No.: PCT/EP2017/064861
§ 371 (c)(1),
(2) Date: Feb. 20, 2019

(87) PCT Pub. No.: WO2018/036682
PCT Pub. Date: Mar. 1, 2018

(65) Prior Publication Data
US 2019/0202152 A1    Jul. 4, 2019

(30) Foreign Application Priority Data
Aug. 23, 2016    (DE) .................... 10 2016 215 730.2

(51) Int. Cl.
*B29D 29/10*    (2006.01)
*F16G 5/06*    (2006.01)
(Continued)

(52) U.S. Cl.
CPC ............. *B29D 29/103* (2013.01); *F16G 5/06* (2013.01); *F16G 5/20* (2013.01); *F16G 1/28* (2013.01)

(58) Field of Classification Search
CPC .................................................. B29D 29/103
See application file for complete search history.

(56) References Cited

U.S. PATENT DOCUMENTS 4,253,836 A  *  3/1981  Miranti, Jr. ............ B29D 29/00
                                                        156/137
5,221,395 A  *  6/1993  Luetkens, Jr ............. B32B 5/18
                                                        156/244.11
(Continued)

FOREIGN PATENT DOCUMENTS

CH         430171 A      2/1967
CH         661897 A5     8/1987
(Continued)

OTHER PUBLICATIONS

International Search Report dated Sep. 4, 2017 of international application PCT/EP2017/064861 on which this application is based.

*Primary Examiner* — Timothy Kennedy
*Assistant Examiner* — Farah Taufiq
(74) *Attorney, Agent, or Firm* — David L. Cate; Gregory Adams

(57) ABSTRACT

A process for the production of a traction or carrying means built up from a plurality of components or assemblies of extruded elastomeric material, wherein, in a first substep, a first component, provided with reinforcing members or cables, of the traction or carrying means is produced and, in further substeps, a traction or carrying means, which is connected to further components or provided with further layers of elastomeric material, fabric layers or reinforcing-member layers, is successively completed, and optionally said traction or carrying means is shaped on one or more sides, wherein the individual substeps follow one another such that a component processed or completed in the respectively preceding substep is fed at room temperature (Rt), after a maximum of 1 to 10 minutes, to the subsequent (Continued)

substep, and such that the temperature of the component does not drop below 30° C. between a respectively preceding substep and the subsequent substep.

11 Claims, 2 Drawing Sheets

(51) Int. Cl.
    *F16G 5/20*     (2006.01)
    *F16G 1/28*     (2006.01)

(56) References Cited

U.S. PATENT DOCUMENTS

| | | | |
|---|---|---|---|
| 9,421,722 B2 | 8/2016 | Knox et al. | |
| 2004/0022890 A1* | 2/2004 | Goser | B29D 29/00 |
| | | | 425/503 |
| 2009/0127739 A1 | 5/2009 | Goser | |
| 2012/0329591 A1* | 12/2012 | Goeser | D07B 1/165 |
| | | | 474/238 |
| 2013/0153126 A1 | 6/2013 | Knox | |

FOREIGN PATENT DOCUMENTS

| | | | |
|---|---|---|---|
| CN | 101242940 A | 8/2008 | |
| CN | 104053538 A | 9/2014 | |
| DE | 3527640 A1 | 2/1987 | |
| DE | 10222015 A1 | 12/2003 | |
| EP | 0888858 A2 | 1/1999 | |
| WO | WO-2009037011 A1 * | 3/2009 | ............ B29D 29/10 |

* cited by examiner

PROCESS FOR THE MULTI-STAGE PRODUCTION OF A TRACTION OR CARRYING MEANS

The invention relates to a process for the production, in a plurality of substeps, of a traction or carrying means built up from a plurality of components or assemblies and consisting of elastomeric material, in particular for the production of an elevator belt, in which the elastomeric material is preferably extruded, wherein, in a first substep, a first component/assembly, provided with reinforcing members or cables, of the traction or carrying means is produced and, in further substeps, a traction or carrying means, which is connected to further components or provided with further layers of elastomeric material, fabric layers or reinforcing-member layers, is successively completed, and optionally said traction or carrying means is shaped or profiled on one or more sides, wherein the connection of the individual components of the traction or carrying means and its shaping and completion by further layers in the individual substeps are achieved by means of optionally profiled shaping wheels to which the individual components or layers are fed and, with the aid of press-on rollers or roller-guided press-on belts acting on a circumferential sector of the shaping wheels, are brought together and connected to one another.

Processes and devices for the multi-stage production of traction or carrying means, which are built up from a plurality of components or assemblies, with the aid of shaping rollers on which the individual components are shaped and connected to one another, are known essentially as two-stage processes in the prior art.

DE 102 22 015 A1 discloses in this respect a device having two stations for the production of a belt from plasticizable plastic material, in which first of all a partial belt provided with reinforcing members is produced and then a second partial belt is produced and connected to the first partial belt. Here, the first station is provided with an endless shaping belt which, with the aid of an upper and a lower pressure roller and a tensioning roller, forms a shaping cavity with a shaping wheel into which the reinforcing members also run. By contrast, the second station is provided only with a press-on roller which acts against a further shaping roller, with the result that a fed-in further material is connected to the first component. There is no discussion of a profiling here.

DE 35 27 640 C2 discloses a device for the production of belts consisting of plasticizable material having a first station for the production of a first partial belt and a second station for the production and shaping of a second partial belt onto the first partial belt. Both stations are assigned an extruder which delivers the material for the respective partial belt to be produced. Both stations each also have an endless shaping belt and a rotatable shaping wheel which is brought together with the shaping wheel along a partial circumference, to be precise in such a way that a shaping cavity arises between them both. Here, the shaping wheel of the second station is designed such that a toothed profile is shaped into a further layer of the belt.

CH 430 171 A discloses a process for the production of webs or sheets consisting of thermoplastics, in which a reinforcing layer runs in between two webs or sheets (components) guided by rollers during the production, and the webs then fuse with one another under the action of temperature and under pressure by means of positioned rollers.

More recent demands on traction or carrying means consisting of elastomeric material require the use of further layers or applied layers, for example layers which provide increased fire protection, layers/fabrics which, in the case of an automatic start-stop mechanism in motor vehicles, reduce the friction wear of toothed belts, or profiles which, in the case of elevator belts, allow better guidance. For the production of traction or carrying means for all these applications, the previously known devices and processes are suitable only to a limited extent.

With the previous two-stage processes, further layers can only be realized by the belts being guided multiple times through a one- or two-stage process. This applies in particular also to those belts which are intended to have a cover layer shaped on both sides. In the case of some of these belts for high loading, high value is placed on the fact that the shaped cover layer is not to be created by subsequent abrasive mechanical processing. Accordingly, a shaping can occur only by virtue of the fact that these belts are "moved through the system" multiple times.

This results not only in extra costs but there is also an increased risk that the cover layers are not sufficiently connected to one another. Polyurethane (PU) for example is hygroscopic and absorbs moisture from the surroundings, which can then lead to processing problems in belts consisting of this material (problems such as bubble formation between the cover layers and resultant poor connection of the layers).

The moisture absorption of such materials is highly dependent on the ambient moisture and the duration of action. Saturation can already be reached even after a few hours. If then, for example, the second cover layer is applied only on the following day, the product to be coated must possibly already be thoroughly predried.

The risk of contamination also increases with multiple handling. This contamination can lead, for example, also to bonding disturbances between the cover layers.

The object for the invention thus consisted in providing an improved, reliable production process for traction or carrying means which consist of a plurality of functional parts or functional layers and can be adapted for particular applications, and in which the stated disadvantages through moisture or contamination no longer arise.

This object is achieved by the features of the main claim. Further advantageous configurations are disclosed in the dependent claims.

Here, the individual substeps in the production process follow one another such that a component processed or completed in the respectively preceding substep is fed at room temperature (Rt), after a time period of 1 to a maximum of 10 minutes, preferably 2 to 5 minutes, to the subsequent substep for further processing or completion, and such that the temperature of the component does not drop below 30° C., preferably 40°, between a respectively preceding substep and the subsequent substep. By setting up the process in such a way, an excessive moisture absorption and a contamination are avoided and there occurs a secure connection of all the individual layers applied in the different substeps.

In an advantageous development, the individual substeps in the process follow one another such that a component processed or completed in the respectively preceding substep is fed to the subsequent substep for further processing or completion at the latest after expiry of a time period which, starting from 10 minutes at room temperature (Rt), is extended by a maximum of 10 minutes per 10° C. temperature increase, and such that the temperature of the component does not exceed an upper limit of 100° C., preferably 80° C. It is thus possible to achieve a certain flexibility in the production with respect to the moisture absorption, with the result that the process, depending on the required production speed, can also be reliably carried out at higher temperatures and problems in the connection of the individual layers can be eliminated.

In a further configuration of the process, the traction or carrying means is designed as a V-ribbed belt, is built up from at least three components or assemblies and is produced in at least three substeps, wherein, in the first substep, a first component in the form of a back layer, provided with reinforcing members, of the V-ribbed belt is produced on a first shaping wheel having a smooth surface, and, in the second substep, the back layer is provided with the profiled substructure of the V-ribbed belt, wherein the substructure is profiled on a second shaping wheel during the second substep, and, in the third substep, a further coating, elastomer layer or fabric layer is applied to the profiled substructure on a further shaping wheel. By contrast, the application of such further coatings, be it as a further layer on the shaped substructure or as a further layer on the generally smooth back, is relatively complicated by means of the processes known previously in the prior art, since the belts had to be moved through the system multiple times. The production is substantially simplified with the process according to the invention.

This applies to an increased degree to a further advantageous configuration of the process, in which the traction or carrying means is designed as a double-profiled elevator belt, is built up from at least three components or assemblies and is produced in at least three substeps, wherein, in the first substep, a first component in the form of a layer of the elevator belt that is provided with partially sheathed carrying cables is produced by means of a profile provided on a first shaping wheel, and, in the second substep, the partially sheathed carrying cables are completely sheathed, wherein the sheathing is further shaped during the second substep by means of a profile provided on a second shaping wheel, and then, in a third substep, after the elevator belt has been twisted through 180°, the component runs onto a third shaping wheel and is provided there with a profiled back layer consisting of elastomeric material, wherein the back layer is applied between component and third shaping wheel and profiled by the latter.

A further advantageous configuration of the process consists in the fact that, in the individual substeps, the elastomeric material used for the components is polyurethane which is applied in extruded form to the respective shaping wheel, wherein the extruded polyurethane melt is fed to the respective shaping wheel at a temperature of 180° C. to 220° C., preferably 210° C., wherein the shaping wheel is cooled and the cooling of the shaping wheel and its production speed are set such that, upon running off the shaping wheel, the respective component has a temperature of 60° C. to 100° C., and in which, in the following substeps, directly prior to the feeding of further extruded material, the preceding, already finished component is heated, on its surface to be connected to the further components, to a temperature of 160° C. to 200° C. Such process management ensures excellent shapeability in the individual substeps and sufficient recrystallization and stabilization of the shaping between the individual shaping steps/substeps. The heating prior to the feeding of further material or further components optimizes the adhesion between the individual assemblies/components.

The process can also be used in an equally advantageous manner for the production of multi-layer transport belts.

The invention will be explained in more detail with reference to an exemplary embodiment. In the figures:

FIG. 1 shows, in the form of a basic diagram, the implementation of the process for producing a V-ribbed belt, in which the profiled V-ribs are provided with a specific fire protection coating.

Figure 1:
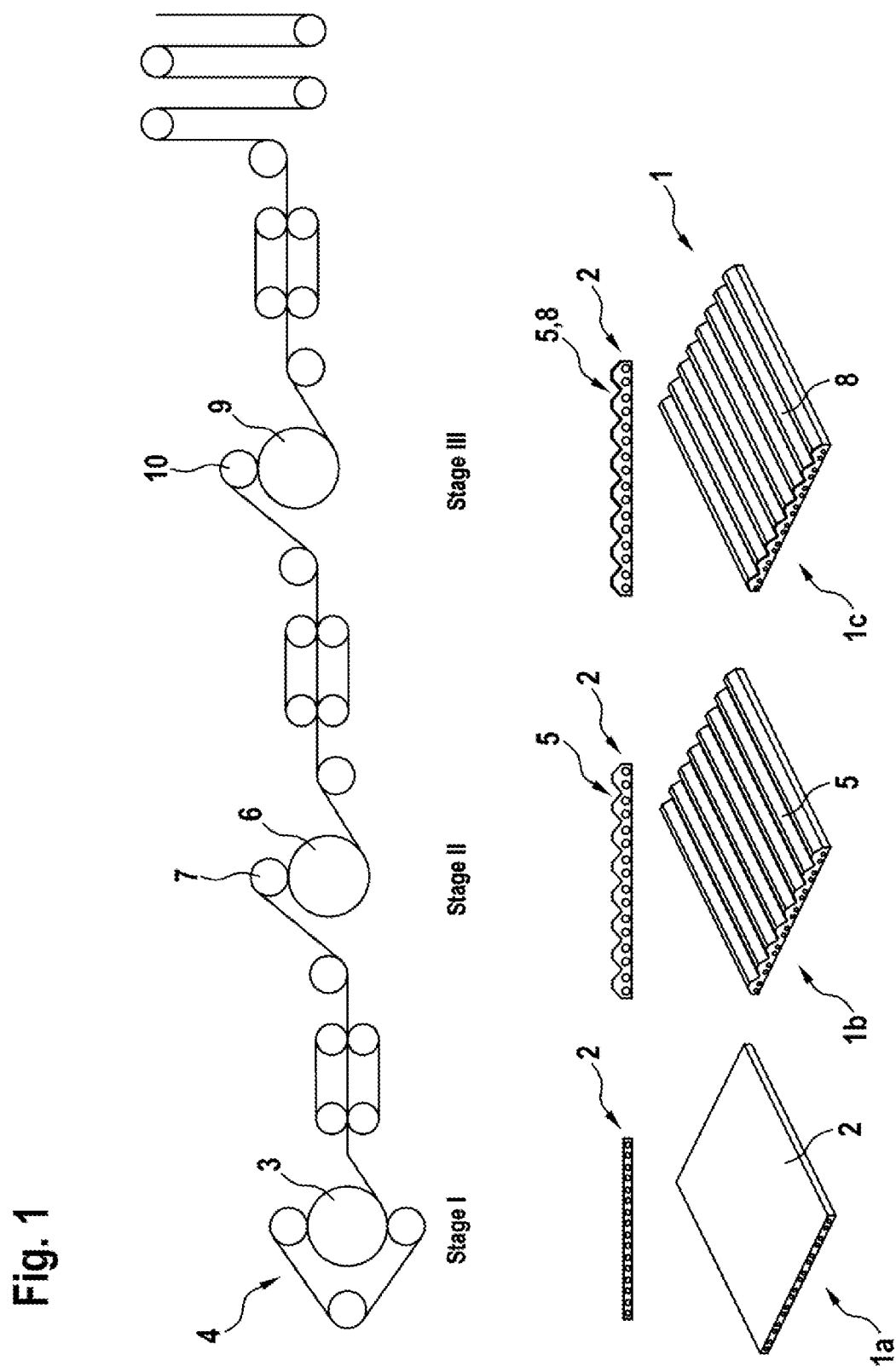
FIG. 1 is a basic diagram showing the implementation of the process for producing a V-ribbed belt.

Here, the traction or carrying means is designed as a V-ribbed belt 1, consists of three components or assemblies 1a, 1b and 1c and is produced in three substeps, designated in the diagram by stage I, stage II and stage III.

In the first substep (stage I), a first component is produced in the form of a back layer 2 of the V-ribbed belt that is provided with reinforcing members.

This occurs on a first shaping wheel 3 which has a substantially smooth surface. In this respect, and not shown in further detail here, a plasticizable elastomeric material, for example polyurethane, is passed from an extruder to the temperature-controlled shaping wheel. At the same time, the reinforcing members or cords run into the elastomeric material and onto the shaping wheel via a corresponding feed.

By means of a roller-guided press-on belt 4 acting on a circumferential sector of the shaping wheel, the reinforcing members and the extruded material are brought further together and connected to one another under pressure on the smooth shaping wheel 3.

In the second substep (stage II), the back layer 2 is provided with the profiled substructure 5 of the V-ribbed belt, the actual "ribs" of the V-ribbed belt. For this purpose, further elastomeric material is fed from a second extruder (likewise not shown in further detail), together with the back layer 2, to the shaping wheel 6 and connected to one another under pressure, here by means of the press-on roller 7. The substructure 5 is profiled on the shaping wheel 6 during the second substep.

In a third substep (stage III), a further fire-retardant elastomer coating is applied to the profiled substructure. For this purpose, an elastomeric material 8 provided with fire-retardant additives is fed from a third extruder (likewise not shown in further detail here), together with the back layer 2 already provided with the substructure 5, to the shaping wheel 9 and applied as a further layer to the existing assembly under pressure of the press-on roller 10. The elastomeric material 8 provided with fire-retardant additives is profiled on the shaping wheel 9 during the third substep, that is to say shaped here into the already embossed profile.

The V-ribbed belt shown here is produced at room temperature. The individual substeps in the process follow one another such that a component processed or completed in the respectively preceding substep is fed at room temperature (Rt), after a maximum of 1 to 10 minutes, here 4 minutes, to the subsequent substep for further processing or completion, and such that the temperature of the component does not drop below 30° C., preferably 40° C., between a respectively preceding substep and the subsequent substep. This is readily possible with the continuously operating production system shown in FIG. 1 and results in a secure interconnection of the individual layers.

Figure 2:
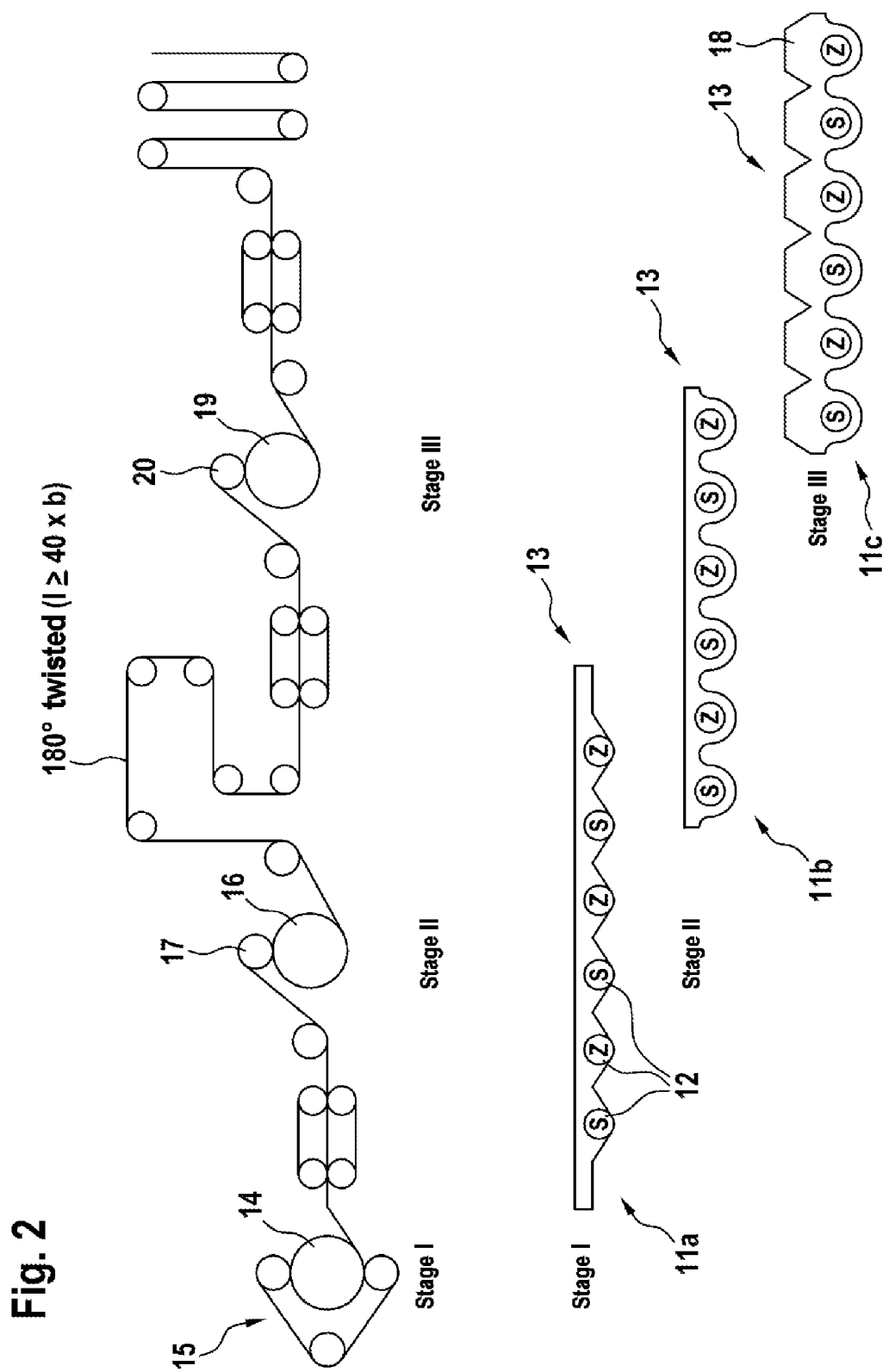
FIG. 2 is a basic diagram showing the implementation of the process for producing a double-profiled elevator belt.

FIG. 2 shows, in the form of a basic diagram, the implementation of the process for producing a double-profiled elevator belt.

Here, the traction or carrying means is designed as an elevator belt 11, consists of three components or assemblies 11a, 11b and 11c and is produced in three substeps, designated in the diagram by stage I, stage II and stage III.

In the first substep (stage I), a first component is produced in the form of a layer 13 of the elevator belt that is provided with only partially sheathed carrying cables 12.

This occurs on a first shaping wheel 14 which has a surface profile which is negative to the profile of the layer 13. In this respect, and not shown in further detail here, a plasticizable elastomeric material is passed from an extruder to the temperature-controlled shaping wheel. At the same time, the carrying cables 12 run into the elastomeric material and onto the shaping wheel 14 via a corresponding feed.

By means of a roller-guided press-on belt 15 acting on a circumferential sector of the shaping wheel 14, the carrying cables and the extruded material are brought further together and connected to one another under pressure. In this first substep, the carrying cables 12 are only partially sheathed.

In the second substep (stage II), the partially sheathed carrying cables are completely sheathed. The complete sheathing is achieved by means of a profile provided on a second shaping wheel 16. For this purpose, further elastomeric material is fed from a second extruder (likewise not shown in further detail), together with the layer 13, to the shaping wheel 16 and connected to one another under pressure, here by means of the press-on roller 17.

In a third substep (stage III), after the elevator belt has been twisted through 180°, the first component is provided with a profiled back layer 18 consisting of elastomeric material, wherein the back layer is applied to a third shaping wheel 19 and profiled, in the same way as described above, with the addition of further extruded material and using a press-on roller 20.

LIST OF REFERENCE SIGNS (Part of the Description)
1 V-ribbed belt
1a-1c components/assembly of the V-ribbed belt
2 back layer
3 shaping wheel
4 press-on belt
5 substructure
6 shaping wheel
7 press-on roller
8 fire-retardant elastomeric material
9 shaping wheel
10 press-on roller
11 elevator belt
11a-11c components/assembly of the elevator belt
12 carrying cable
13 first layer of the elevator belt
14 shaping wheel
15 press-on belt
16 shaping wheel
17 press-on roller
18 profiled back layer of the elevator belt
19 shaping wheel
20 press-on roller

The invention claimed is:

1. A process for producing elastomeric belts comprising:
i) providing first component in the form of a back layer by extruding a plasticizable elastomeric material from a first extruder onto a first shaping wheel while running reinforcing members into the plasticizable elastomeric material, wherein the first shaping wheel has a smooth surface;
ii) forming a profiled substructure on the back layer by feeding an elastomeric material from a second extruder onto the back layer and then passing over a press-on roller under pressure; and,
iii) applying a fire-retardant elastomer coating on the profiled substructure from a third extruder while passing the fire-retardant elastomer coating and the profiled substructure on a second shaping wheel, wherein the fire-retardant elastomer coating has embossed profile matching the profiled substructure;
wherein individual substeps i), ii) and iii) in the process follow one another such that a component processed or completed in the respectively preceding substep is fed at room temperature (Rt) after a time period of 1 to 10 minutes, to the subsequent substep for further processing or completion, and such that temperature of the component does not drop below 30° C., between a respectively preceding substep and the subsequent substep; and,
wherein the individual substeps i), ii) and iii) in the process follow one another such that a component processed or completed in the respectively preceding substep is fed to the subsequent substep for further processing or completion at the latest after expiry of a time period which, starting from the maximum of 10 minutes at room temperature (Rt), is extended by a maximum of 10 minutes per 10° C. temperature increase, and such that the temperature of the component does not exceed an upper limit of 100° C.

2. The process for producing elastomeric belts according to claim 1, wherein the individual substeps i), ii) and iii) in the process follow one another such that a component processed or completed in the respectively preceding substep is fed at room temperature (Rt) after a time period of 2 to 5 minutes.

3. The process for producing elastomeric belts according to claim 1, wherein individual substeps i), ii) and iii) in the process follow one another such that a component processed or completed in the respectively preceding substep is fed at room temperature (Rt) after a time period of 1 to 10 minutes, to the subsequent substep for further processing or completion, and such that the temperature of the component does not drop below 40° C., between a respectively preceding substep and the subsequent substep.

4. The process for producing elastomeric belts according to claim 1, the temperature of the component does not exceed an upper limit of 80° C.

5. The process for producing elastomeric belts according to claim 1, wherein the elastomeric belts are V-ribbed belts, and wherein at least one of a further coating, elastomer layer or fabric layer is applied to the profiled substructure in substep iii).

6. The process for producing elastomeric belts according to claim 1, wherein the elastomeric belts are double-profiled elevator belts provided with partially sheathed carrying cables produced by a profile provided on the first shaping wheel, and wherein in the substep ii) the partially sheathed carrying cables are completely sheathed.

7. The process for producing elastomeric belts according to claim 6, wherein the sheathing is further shaped during the substep ii) with a profile provided on the second shaping wheel.

8. The process for producing elastomeric belts according to claim 7, wherein in substep iii) the elevator belt has is twisted 180° and then component runs onto a third shaping wheel to provide a profiled back layer having an elastomeric material.

9. The process for producing elastomeric belts according to claim 8, wherein the back layer is profiled by the third shaping wheel.

10. The process for producing elastomeric belts according to claim 8, wherein elastomeric materials are a polyurethane which is applied in extruded form to the respective shaping wheel, wherein the extruded polyurethane melt is fed to the respective shaping wheel at a temperature of 180° C. to 220° C., wherein the respective shaping wheel is cooled and the cooling of the shaping wheel and its production speed are set such that, upon running off the shaping wheel, the respective component has a temperature of 60° C. to 100° C., and in which, in the following substeps, directly prior to the feeding of further extruded material, the preceding, already finished component is heated, on its surface to be connected to the further components, to a temperature of 160° C. to 200° C.

11. The process for producing elastomeric belts according to claim 1, wherein the elastomeric belts are multi-layer transport belts.

* * * * *